Oct. 1, 1935.        R. H. MOULTON        2,015,758
SHOCK ABSORBER
Original Filed Aug. 20, 1930
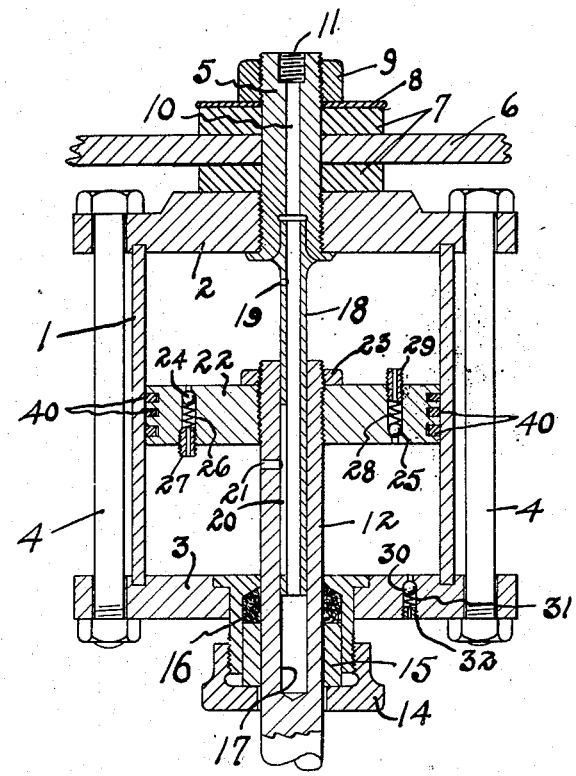
INVENTOR.
Rollin H. Moulton
BY
Darby & Darby
ATTORNEYS.

Patented Oct. 1, 1935

2,015,758

UNITED STATES PATENT OFFICE 2,015,758

SHOCK ABSORBER

Rollin H. Moulton, Berwyn, Ill., assignor to National Pneumatic Company, New York, N. Y., a corporation of West Virginia Original application August 20, 1930, Serial No. 476,590. Divided and this application November 17, 1934, Serial No. 753,432

8 Claims. (Cl. 188—88)

This invention relates to improvements in shock absorbers or cushioning devices, and more particularly to that class of device adapted to be used on road vehicles, airplanes, track vehicles, or in fact between any parts having relative movement therebetween where it is desired to retard or cushion the movements between said parts.

The general assembly of the detailed objects and advantages of this invention are fully set forth in applicant's copending application Serial No. 476,590, filed August 20, 1930 for "Shock absorber", of which this application is a division and need not be repeated here, except as will be apparent from the following description of the structure and operation of the device.

This invention resides substantially in the combination, construction, arrangement and relative location of parts, all as will be fully described below.

In the drawing, the single figure is a vertical, central, cross-sectional view through the shock absorber of this invention.

The structure employed for illustrating the invention comprises a cylinder 1, fitting into annular grooves in the ends or heads 2 and 3 which are drawn into fluid tight engagement with the ends of the cylinder which fit in the grooves by means of nuts and bolts 4. The head 2 is provided with a short stud 5, which threadedly engages therewith to provide means for mounting the shock absorber at one end. One of the relatively movable parts to be cushioned is shown at 6 encircling this stud 5, and clamped between the rubber or rubberized blocks 7 by means of the washer 8 and nut which engages the threaded end of the stud. The stud is provided with a central passage 10 extending therethrough and terminating in an enlarged threaded receptacle 11 by means of which a flexible pipe or tube may be attached thereto. The pipe or tube, not shown, is connected to a fluid pressure source such as the air brake system of a railway or bus vehicle, so as to supply air into the cylinder above atmospheric pressure.

At 12 is a piston rod which protrudes through the head 3 at a packing gland comprising the tubular member 13 sealed in the head and threaded at its outer end to receive an adjustable screw cap 14. The cap 14 engages a sleeve 15 normally fitting around the shaft which acts as a plunger under the action of the cap to compress the packing material 16 into fluid tight engagement with the piston rod. The piston rod has a bore 17 extending outwardly from its inner end. At 18 is a tube which depends from the inner end of the stud 10 to which it is secured in any suitable manner, as by welding, which tube has a passage therethrough in communication with the passage 10 of the stud. At 19 is a hole in the tube wall which establishes communication between the upper end of the cylinder and the passage in the tube. At 20 is illustrated a slot in the tube 18 which extends upwardly from its lower end in alignment with a hole 21 in the piston rod which establishes communication between the lower end of the cylinder and the passage in the tube 18.

The end of the piston rod projecting into the cylinder is threaded to receive a piston disc 22 and a lock nut 23 for holding it in place. As illustrated, the piston disc has a plurality of annular grooves in which metal piston rings 40 of substantially the same cross section are mounted. These piston rings, of course, prevent leakage from one end of the cylinder to the other past the piston disc.

It is of course apparent that other equivalent means may be employed for this purpose. The piston disc has a pair of passages extending entirely therethrough and formed to provide seats for the valve members 24 and 25, which seat in opposite directions. The valve member 24 is normally held seated by means of a spring 26, which may be tensioned by the adjustable apertured plug 27. Similarly, the valve member 25 is held seated by means of a spring 28 tensioned by the adjustable apertured plug 29. The head 3 is provided with a passage therethrough forming a seat for the valve member 30 which is likewise normally held seated by means of spring 31 tensioned by an adjustable apertured plug 32.

In the operation of this device the stud end is attached to one of the relatively movable members, as illustrated, and the piston rod 12 is attached to the other relatively movable member, not shown. For example, the member 6 may be taken to illustrate the chassis of an automobile and the piston rod will be connected to the axle thereof, so as to cushion relative movement between the axle and wheel assembly and the chassis. When the parts are in normal position the piston is at approximately the center of the cylinder, as illustrated, and both ends of the cylinder are maintained at a pressure above atmospheric pressure by supplying a pressure fluid such as air to the ends thereof through passage 10 and tube 18 from any suitable source. The amount of this pressure will depend upon the weight and size of the parts and the desired operating characteristics from the device.

As will be apparent air will be supplied to the cylinder ends from the tube 18 through the aperture 19 and the slot 20 and aperture 21. When the walls of the slot strike an obstruction the piston 22 will move upwardly compressing the air above the piston and tending to rarify it below the piston. However, the pressure below the piston will be maintained by the introduction of additional air from the source through tube 18. It is of course apparent that some air will be forced through tube 18 from the upper end of the cylinder into the lower end but if the shock is sudden and violent the pressure in the upper end of the cylinder will of course build up faster than it can be relieved through tube 18. In this case valve 24 will open, depending upon its adjustment, at a predetermined pressure in the upper end of the cylinder to by-pass air around valve 24 into the lower end of the cylinder. Upon the return stroke, when the piston 22 is moving downwardly, a similar action will occur wih the exception that in this case air will be by-passed from the lower end of the cylinder to the upper end around the valve member 25. If the pressure in the lower cylinder exceeds a predetermined value the valve member 30 will be opened to discharge some air into the atmosphere from the lower end of the cylinder.

As will be apparent with a device of this type, a controlled shock absorbing and snubbing action is secured.

An important feature of the invention is represented by the fact that the pressure below the cylinder is always maintained at least at a predetermined value, so that the device will not have a jerky operation with a period when the pressure in the lower end of the cylinder is too low, permitting too rapid return of the piston, as is often common with prior art shock absorbers.

From the above description it will be apparent that this invention resides in certain principles of construction and operation which may be embodied in other forms and carried out in other ways by those skilled in the art without departure from the scope thereof. I do not, therefore, desire to be strictly limited to the disclosure as given for purposes of illustration, but rather to the scope of the appended claims.

What I seek to secure by United States Letters Patent is—

1. In a shock absorber, the combination of a cylinder, a piston disposed therein, a piston rod connected to said piston and extending outwardly of one end of said cylinder, means for by-passing fluid from one side of said piston to the other, said piston rod having a channeled portion communicating with one end of said cylinder, and a sleeve cooperating with said channel communicating therewith and with said other end of said cylinder, and means in said piston for by-passing from either side of said piston to the other after a predetermined pressure is built up in the end of said cylinder from which by-passing is effected.

2. A shock absorber as described comprising a cylinder, a piston disposed therein, a piston rod connected to said piston and extending outwardly of said cylinder, said piston rod having a passage therein opening into the end of the cylinder from which the piston rod extends, and a tube mounted at the other end of the cylinder to cooperate with said passage having apertures on opposite sides of the piston, said tube being adapted to be connected to an external pressure source.

3. A shock absorber as described comprising a cylinder, a piston disposed therein, a piston rod connected to said piston and extending outwardly of said cylinder, said piston rod having a passage therein opening into one end of the cylinder, and a tube mounted to cooperate with said passage having apertures on opposite sides of the piston, said tube being adapted to be connected to an external pressure source, and valve means on the piston for by-passing air from either end of the cylinder to the opposite end.

4. A shock absorber as described comprising a cylinder, a piston disposed therein, a piston rod connected to said piston and extending outwardly of said cylinder, said piston rod having a passage therein opening into one end of the cylinder, a tube mounted to cooperate with said passage having apertures on opposite sides of the piston, said tube being adapted to be connected to an external pressure source, valve means on the piston for by-passing air from either end of the cylinder to the opposite end, and means at one end of the cylinder for exhausting air therefrom to the atmosphere.

5. A shock absorber as described comprising a cylinder, a piston disposed therein, a piston rod connected to said piston and projecting exteriorly of the cylinder at one end, a stud mounted on the other end of the cylinder and having a passage therethrough opening into the cylinder, said passage providing means for supplying air under pressure to the cylinder, said piston rod having a passage therein, a tube establishing communication between the passage in the stud and the passage in the piston rod, said tube and piston rod having apertures on opposite sides of the piston for establishing communication with the cylinder end.

6. A shock absorber as described comprising a cylinder, a piston disposed therein, a piston rod connected to said piston and projecting exteriorly of the cylinder at one end, a stud mounted on the other end of the cylinder and having a passage therethrough opening into the cylinder, said passage providing means for supplying air under pressure to the cylinder, said piston rod having a passage therein, a tube establishing communication between the passage in the stud and the passage in the piston rod, said tube and piston rod having apertures on opposite sides of the piston for establishing communication with the cylinder end, and valve means for by-passing air from either end of the cylinder to the other end.

7. A shock absorber as described comprising a cylinder, a piston disposed therein, a piston rod connected to said piston and projecting exteriorly of the cylinder at one end, a stud mounted on the other end of the cylinder and having a passage therethrough opening into the cylinder, said passage providing means for supplying air under pressure to the cylinder, said piston rod having a passage therein, a tube establishing communication between the passage in the stud and the passage in the piston rod, said tube and piston rod having apertures on opposite sides of the piston for establishing communication with the cylinder end, and valve means on the piston for by-passing air from either end of the cylinder to the other when the pressure therein exceeds a predetermined amount.

8. A shock absorber as described comprising a cylinder, a piston disposed therein, a piston rod connected to said piston and projecting exteriorly of the cylinder at one end, a stud mounted on the other end of the cylinder and having a passage therethrough opening into the cylinder, said passage providing means for supplying air under pressure to the cylinder, said piston rod having a passage therein, a tube establishing communication between the passage in the stud and the passage in the piston rod, said tube and piston rod having apertures on opposite sides of the piston for establishing communication with the cylinder end, valve means on the piston for by-passing air from either end of the cylinder to the other when pressure therein exceeds a predetermined amount, and means at one end of the cylinder for exhausting air from that end to the atmosphere when the pressure therein exceeds a predetermined amount.

ROLLIN H. MOULTON.